TELEVISION SHADING SIGNAL AND CLAMPING CIRCUIT

Filed Dec. 30, 1949 2 Sheets-Sheet 1

INVENTOR.
HARRY R. SMITH
BY Darby & Darby
ATTORNEYS

Nov. 3, 1953 H. R. SMITH 2,658,104

TELEVISION SHADING SIGNAL AND CLAMPING CIRCUIT

Filed Dec. 30, 1949 2 Sheets-Sheet 2

INVENTOR.
HARRY R. SMITH

BY Darby & Darby
ATTORNEYS

Patented Nov. 3, 1953 2,658,104

UNITED STATES PATENT OFFICE 2,658,104

TELEVISION SHADING SIGNAL AND CLAMPING CIRCUIT

Harry R. Smith, Glen Ridge, N. J., assignor to Allen B. Du Mont Laboratories, Inc., Passaic, N. J., a corporation of Delaware Application December 30, 1949, Serial No. 136,091

2 Claims. (Cl. 178—7.2)

This invention relates to electronic systems and more particularly to television transmitter shading signal circuits.

It is sometimes desirable to employ an iconoscope as a television pick-up device in systems using a circuit to refer, or clamp, a predetermined portion of each horizontal line period to a definite voltage level. Since the iconoscope requires shading signals varying at the vertical as well as the horizontal rate, the vertical shading signals would normally be clamped out if they were mixed with the video signals in the manner known in the prior art.

Consequently one object of my invention is to provide an improved television signal generator.

A second object is to provide a method of obtaining vertical shading of a television signal clamped at a horizontal rate.

A third object is to provide an improved device for mixing video and shading signals.

A fourth object is to provide a system for using an iconoscope pick-up tube in a circuit using a line-rate clamp.

Other objects of my invention will be apparent after the specification and drawings in which.

Figure 1:
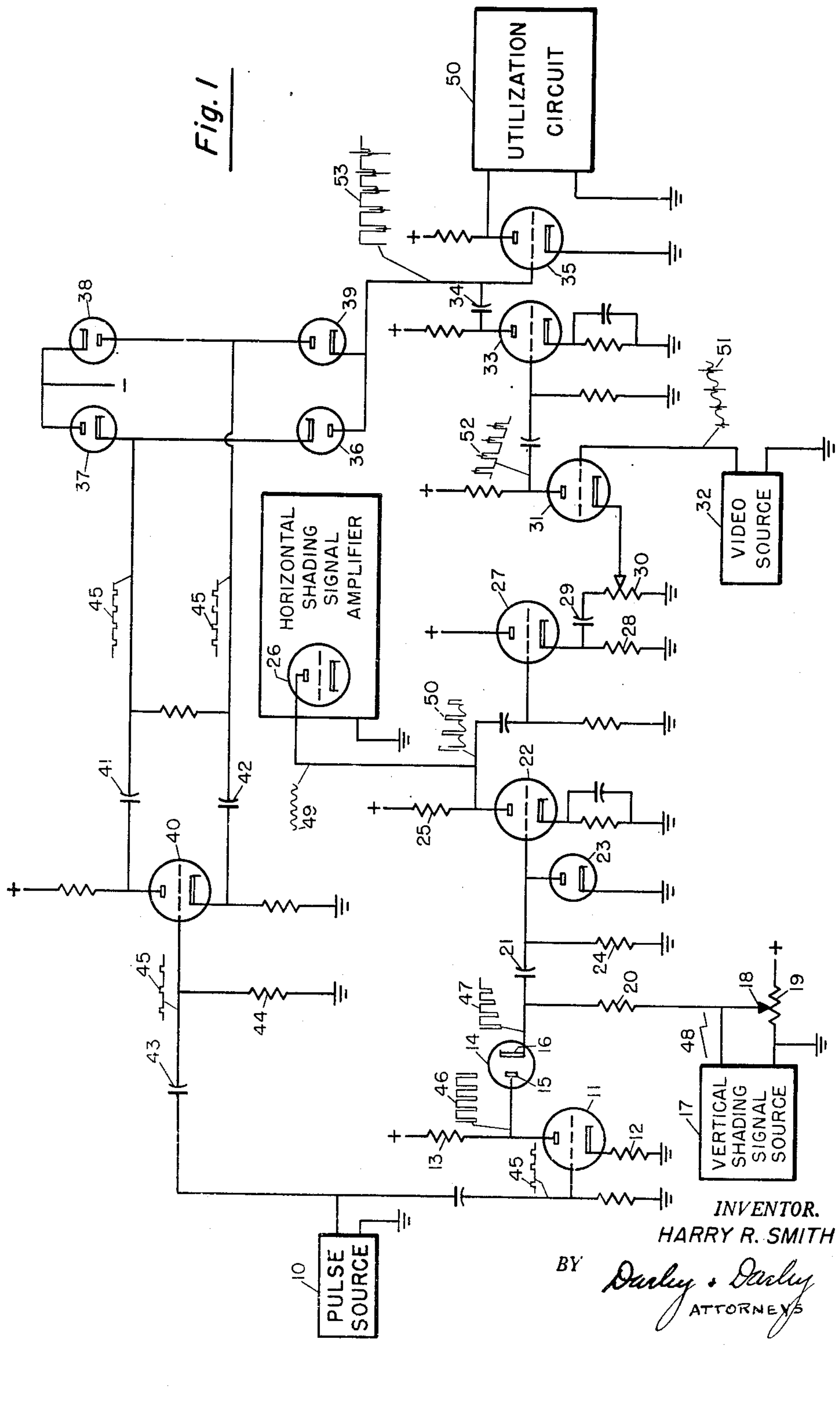
Figure 1 shows one embodiment of the system.

Referring in more detail to Figure 1, there is shown a pulse voltage source 10, which may be a television synchronizing generator, connected to the grid of an amplifier tube 11 having a cathode bias resistor 12 and a plate load resistor 13. A diode tube 14 has its plate 15 connected to the plate of tube 11.

The source 17 of vertical shading signals is connected to the cathode 16 of diode 14 through a resistor 20 and to the sliding contactor 18 of potentiometer 19, which is connected across a source of constant potential. The cathode 16 is connected by means of condenser 21 to the grid of tube 22. A resistor 24 in parallel with a diode 23 is connected between the grid of tube 22 and a source of constant potential. A resistor 25 connected to the plate of tube 22 serves as a common plate load for horizontal shading signal amplifier 26 and tube 22. The plate of tube 22 is coupled to the grid of a cathode follower tube 27 having a resistor 28 in the cathode lead thereof. The cathode follower tube 27 is coupled by means of condenser 29 and potentiometer 30 to the cathode of tube 31. A source 32 of video signals, such as an iconoscope together with its preamplifier, is connected to the grid of tube 31. The plate of this tube 31 is coupled to the grid of an amplifier tube 33 and the plate of this amplifier tube 33 is in turn coupled by means of condenser 34 to the grid of an amplifier tube 35.

In accordance with known principles, four diodes 36, 37, 38 and 39 form a clamp circuit between the grid of the amplifier tube 35 and a source of constant potential.

The source 10 of pulses to operate the clamp circuit is coupled to the junction point of the cathodes of diodes 36 and 37 by means of the plate circuit of a phase inverter amplifier tube 40 through a suitable condenser 41 and by means of the cathode of tube 40 through a suitable condenser 42 to the junction of the anodes of diodes 38 and 39. These pulses generated by pulse source 10, are fed to the grid of the phase inverter amplifier 40 through a condenser 43 and across a resistor 44.

The output voltage of the amplifier tube 35 is connected to a utilization circuit 50 such as a television transmitter.

The pulses indicated at 45 generated by pulse source 10 occur at a frequency equal to the standard television horizontal line frequency and have a negative excursion. The polarity of pulses 45 is inverted by amplifier tube 11 so that they appear at the plate of tube 11 as negative pulses shown at 46.

The effect of diode 14 on pulses 46 is similar to that of a switch. So long as the voltage of plate 15 is positive with respect to cathode 16, the diode 14 forms a low impedance path for the signal current, which is equivalent to saying that the switch is closed. When the plate 15 is negative with respect to the cathode 16, no current flows through the diode 14, and the switch is therefore open. The voltage at plate 15 is determined by the voltage divider action of plate load resistor 13 and tube 11; while the voltage of the cathode is determined by the voltage of the tap 18 on potentiometer 19 and by the voltage drop across resistor 20. If the voltage at tap 18 is negative with respect to the voltage at the plate of tube 11, the switch is closed.

The normal voltage on the plates of tubes 11 and 14 is periodically reduced by the downward swing of pulses 46. Therefore, in order for the diode 14 to conduct for the entire duration of the pulses 46, the voltage on contactor 18 must be negative with respect to the voltage appearing at the plate 15 during peaks of pulses 46 at which times plate 15 assumes its least positive value. Conversely, when it is desired to clip the negative peaks of the pulses 46, it is only necessary to raise the voltage of contactor 18 to such a level that it is positive with respect to the voltage of plate 15 when the pulses 46 cause the plate 15 to assume its least positive value. The voltage at contactor 18 may be varied manually by movement on potentiometer 19 or it may be varied by adding to the D. C. component caused by the voltage divider action of potentiometer 19, a voltage, such as by the sawtooth voltage indicated at 48, generated by the vertical showing signal source 17.

The frequency of the voltage variations of source 17 is equal to the frame frequency of the television signal. Since the pulses 46 occur at a rate equal to the line frequency of the television signal while the fundamental frequency of signal voltage 48 is equal to the frame frequency, signal voltage can modulate the amplitude of the pulses 46. This modulation is accomplished by adding the voltage of signal 48 to the D. C. voltage on contactor 18. As the voltage of contactor 18 and hence of cathode 16 becomes more positive with respect to ground, the amplitude of the pulses 47 appearing at cathode 16 becomes correspondingly smaller, since each time the voltage on the plate of diode 14 decreases, in response to the downward excursion of pulses 46, the absolute voltage level at which plate 15 becomes negative with respect to cathode 16 is higher for each pulse 46 than for the preceding pulse. At the end of the cycle of signal 48, the voltage on contactor 18 returns to its original value.

There would be no change in the operation of the circuit if signal voltage 48 had any other waveshape than the sawtooth form shown. Likewise, there would be no difference if contactor 18 were moved to a higher voltage point on potentiometer 19 and the signal voltage 48 subtracted from the D. C. component instead of being added. If diode 14 were reversed, it would be necessary to reverse the polarity of signal voltages 45 and 48 in which case a wave having the reverse polarity of waveshape 47 would be obtained. Conversely, if the circuit connections of diode 14 were as shown in Figure 1 but the polarity of pulses 46 were reversed, which might be done either by connecting the plate 15 of diode 14 to the cathode of tube 11 or by reversing the polarity of the pulses 45, it would be necessary to reverse the polarity of signal voltage 48 to obtain a wave having the same form as waveform 47, i. e. pulses of decreasing amplitude from the start of the frame to the end, but having the opposite polarity.

The pulses 47 are coupled to amplifier 22 by means of condenser 21, which removes the D. C. component of the pulse wave. It is desirable to restore the D. C. component of pulse wave 47 and this is done by means of the D. C. reinsertion circuit consisting of diode 23 and resistor 24 in combination with condenser 21. Since the condenser 21 need not pass frequencies very much lower than the horizontal line frequency, the time constant of condenser 21 and resistor 24 may be made fairly low, thus excluding to a large extent any power line hum added to pulses 47.

The pulses 47 are amplified in tube 22 and mixed with the horizontal shading signal 49 from amplifier 26 to form the combined shading signal 50 which is applied to the grid of a cathode follower amplifier 27 which in turn feeds the combined shading signal to mixer tube 31.

Figure 2:
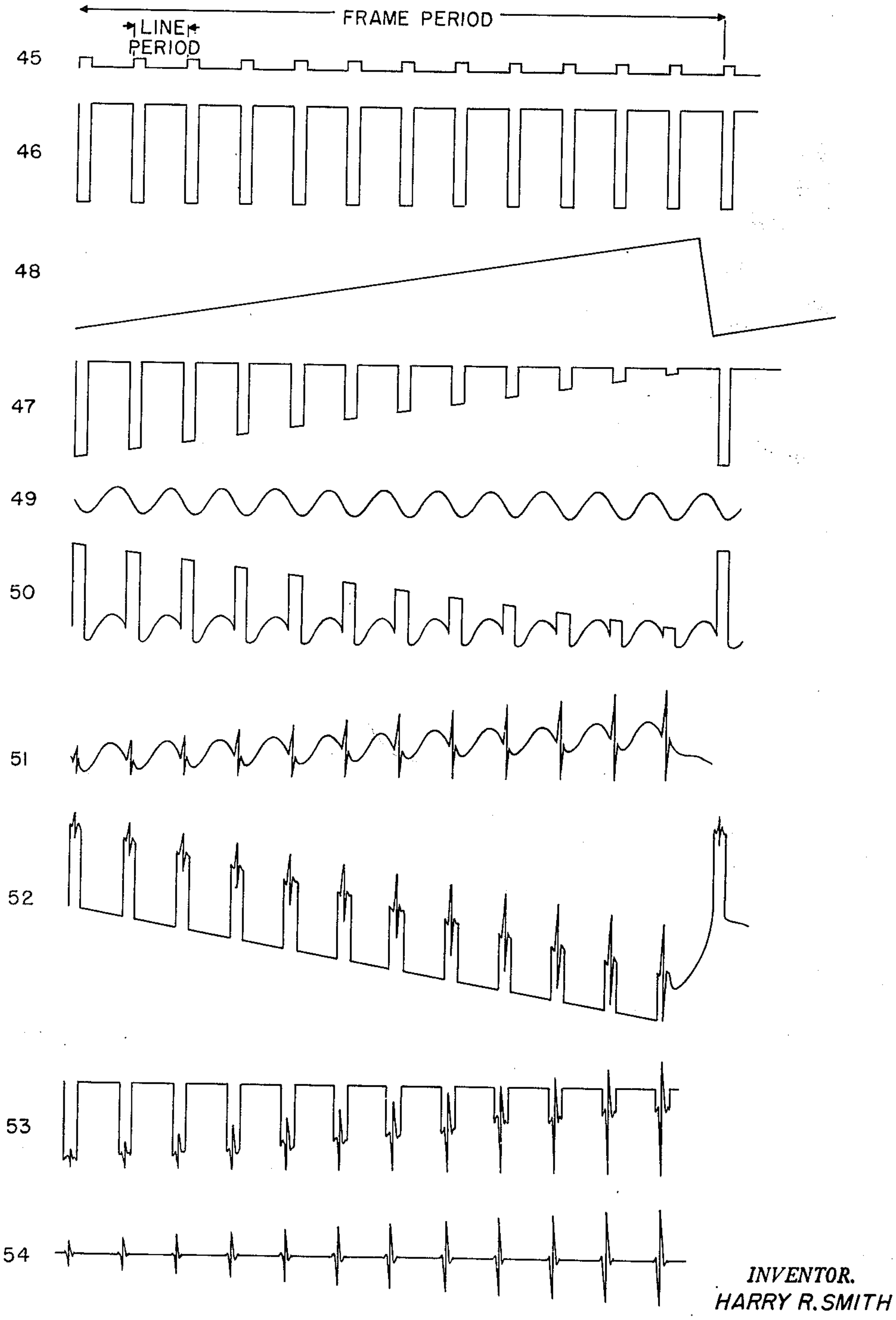
Figure 2 illustrates typical waveforms obtained at various points of the circuit of Figure 1 under normal operating conditions.

The signal voltage fed to the grid of amplifier 31 by the video source 32 is indicated by reference character 51 in Figure 2. The signal 51 is shown sloping downward from the start of a frame to the end at which time it returns to its original value. Each line of signal 51 is shown as having a sinusoidal variation. Although only two shading components are illustrated in signal 51—a sawtooth component in the vertical and a sinusoidal component in the horizontal—iconoscopes can and commonly do have sinusoidal, sawtooth, and parabolic components at both the horizontal and vertical repetition rates.

These shading components are so named because they cause the illumination of the television raster to vary from one part of the picture to another. For instance, the components of signal 51 would cause the television raster to be dim at the top and bright at the bottom as well as dimmer on the left-hand side and brighter on the right.

The composite shading signal is added in mixer tube 31 to the video signal 32 in such a polarity that the line frequency sine wave of the shading signal cancels the sinusoidal component of signal 51 while the amplitude modulated pulses of the shading signal add to the pulses of signal 51 to produce a signal voltage which is amplified by tubes 31 and 33 and applied to the grid circuit of tube 35. The grid of tube 35 is periodically clamped to a fixed reference voltage by a well-known clamping circuit consisting of diodes 36, 37 and 38 and 39. The pulses controlling the action of the clamping circuit have the same repetition rate as the pulses 45 so that, at the occurrence of each pulse, the grid of tube 35 is returned to a fixed voltage level, thus clamping the vertical shading signals into the television signal 53 which is then passed on to a utilization circuit such as a television transmitter.

If the vertical shading signal 48 were mixed with the horizontal shading signal 49 and the resultant wave mixed directly with the signal 51 in order to remove the tilt, a signal such as indicated at 54 would result. If this signal 54 were clamped in the same way as signal 52, the effect would be to remove the shading signal 48, leaving the uncompensated signal 51.

Although the invention has been described in particular terms, the scope is defined in the appended claims.

What is claimed is:

1. In a television system using a clamping circuit to clamp the television signal voltage to a predetermined level during a fixed portion of the blanking interval of each horizontal line period and having a television signal voltage generator which generates a signal voltage having shading components occurring at the vertical repetition rate; a compensating signal generator adapted to generate a signal having the same frequency as said vertical repetition rate; a source of pulses, one of said pulses occurring at said fixed portion of each horizontal line period; a pulse amplitude modulator connected to said source of pulses and to said compensating signal generator for modulating the amplitude of said pulses in accordance with said compensating signals; a mixer circuit connected to said modulator and said television signal voltage generator for combining said television signal voltage and said amplitude modulated pulses; and a clamping circuit connected to said mixer circuit for clamping said combined signal voltage to a fixed level at said fixed portion of each horizontal line period.

2. An electronic circuit for compensating the vertical shading components in a television signal composed of video signals and blanking pulses generated in a television signal generator; said circuit comprising a source of pulses which occur at the same time and for the same duration as said blanking pulses; a compensating signal generator for generating a signal having a frequency equal to said vertical shading components; a pulse amplitude modulation circuit connected to said source of pulses and to said compensating signal generator for modulating the amplitude of said second named pulses in accordance with the waveform of said generated signal; a mixer circuit connected to said modulation circuit and to said television signal generator for mixing said modulated pulses and said blanking pulses; and a clamping circuit connected to said mixer circuit for clamping the television signal to a predetermined level during the blanking portion of said television signal.

HARRY R. SMITH.

References Cited in the file of this patent

UNITED STATES PATENTS

| Number | Name | Date |
| --- | --- | --- |
| 2,166,712 | Bedford | July 18, 1939 |
| 2,295,330 | Blumlein | Sept. 8, 1942 |
| 2,298,863 | Bartelink | Oct. 13, 1942 |
| 2,396,865 | Longhren | Mar. 19, 1946 |